US006725773B2

(12) United States Patent
Dietrich et al.

(10) Patent No.: US 6,725,773 B2
(45) Date of Patent: Apr. 27, 2004

(54) MONITORING DEVICE FOR PRINTER

(75) Inventors: Jens Dietrich, Frankfurt (DE); Johannes Tenfelde, Grosskrotzenburg (DE); Gerold Wende, Frankfurt (DE); Alexnader Wiedekind-Klein, Steinbach (DE)

(73) Assignee: MAN Roland Druckmaschinen AG, Offenbach/Main (DE)

( * ) Notice: Subject to any disclaimer, the term of this patent is extended or adjusted under 35 U.S.C. 154(b) by 0 days.

(21) Appl. No.: 10/181,615

(22) PCT Filed: Dec. 21, 2000

(86) PCT No.: PCT/EP00/13092

§ 371 (c)(1), (2), (4) Date: Oct. 7, 2002

(87) PCT Pub. No.: WO01/53099

PCT Pub. Date: Jul. 26, 2001

(65) Prior Publication Data

US 2003/0101882 A1 Jun. 5, 2003

(30) Foreign Application Priority Data

Jan. 20, 2000 (DE) .................................... 200 00 919 U

(51) Int. Cl.[7] ........................... B41F 7/02; G05B 19/18

(52) U.S. Cl. ........................................... 101/217; 700/3

(58) Field of Search ................................ 101/217, 136, 101/137, 139, 140, 144, 145, 174, 182, 184, 185, 212, 216; 700/3, 9, 12, 108, 204, 244; 709/208, 209, 220, 223, 224, 225

(56) References Cited

U.S. PATENT DOCUMENTS 4,608,631 A * 8/1986 Stiffler et al. ............... 710/113
4,823,914 A * 4/1989 McKinney et al. ......... 187/393
4,951,567 A 8/1990 Rodi et al.
5,161,151 A * 11/1992 Kimura et al. .............. 370/241
5,186,105 A * 2/1993 Emrich et al. .............. 101/217
5,574,437 A 11/1996 Schwinn et al.
5,676,055 A * 10/1997 Schwinn et al. ............ 101/216
5,730,053 A 3/1998 Tenfelde et al.
5,821,990 A * 10/1998 Rudt et al. ..................... 348/88
6,482,296 B1 * 11/2002 Fagerlund et al. .......... 162/253
2002/0139261 A1 * 10/2002 Tokiwa ....................... 101/218

FOREIGN PATENT DOCUMENTS

| | | |
|---|---|---|
| DE | 43 27 848 A1 | 3/1995 |
| DE | 195 20 918 A1 | 12/1996 |
| DE | 195 27 089 A1 | 1/1997 |
| EP | 0 243 728 A2 | 3/1987 |
| EP | 0 685 338 B1 | 5/1995 |
| EP | 1 031 420 A | 2/1999 |

* cited by examiner

*Primary Examiner*—Ren Yan
*Assistant Examiner*—Hoai-An D. Nguyen
(74) *Attorney, Agent, or Firm*—Leydig, Voit & Mayer, Ltd.

(57) ABSTRACT

A monitoring device is provided for a printer, especially a sheet-fed offset printer. The printer has a controller that records the signals of signal transmitters in the individual units of the printer, through which command signals for actuators/drives connected to the control can be generated as a function of the signal state, and a monitoring computer that additionally records the signal states of the signal transmitters and causes the switching off of actuators/drives. In the monitoring device, the signal states of the signal transmitters (G) of the printer units are fed to several slave computers (S), which are connected to each other via a monitoring bus (UB) and to a monitoring master (UM) connected upstream from the monitoring computer (UR). The actuators/drives (A) are connected to respective ones of the slaves (S) and can be switched off by the slaves in response to a command sent by the monitoring master (UM) via the monitoring bus (UB).

8 Claims, 1 Drawing Sheet

MONITORING DEVICE FOR PRINTER

FIELD OF THE INVENTION

The invention relates to a monitoring device for monitoring the operation of a printer, such as a sheet-fed offset printer.

BACKGROUND OF THE INVENTION

Sheet-fed offset printers have a number of units, such as the feeder, delivery device, printing groups, coating and processing devices. Different operating elements in the form of control switches are provided to operate these individual units and the printer as a whole, through which machine operation, certain operational functions, etc., can be initiated. The moving elements, such as cylinders and rollers, are protected by protection elements movable for maintenance purposes, in order to prevent the operator from being exposed to danger from a running machine due to an open protection circuit. The protection elements are protected by sensors and switch elements designed as limit switches. The signals of the operating elements in the individual units, as well as the sensors and switches that protect the individual protection systems, are connected to one or more stations, forming the controller of the printer, which are preferably configured as a computer. A controller, which consists of at least one computer and that records the signal states of the different control elements and protective switches, is known from DE 43 27 848 A1 and EP 0 243 728 A2. DE 195 27 089 A1 and 195 20 918 A1 describe the individual units of the stations designed as a computer and connected to the printer, which combine to form the controller of the printer.

As is known from DE 43 27 848 A1 and EP 0 243 728 A2, certain functions of a printer must be protected redundantly, i.e., the activation of a control element or the opening of a protection system causes the immediate shutdown of the corresponding drive, especially the main drive of the printer. As a result, the signals of the corresponding operating element and the switches that protect the protection system are fed both to the controller and, parallel to it, to a monitoring device configured as a computer. Switching of the drive or drives as a function of the signal state then occurs both via the controller and via the monitoring device. Shutdown therefore also occurs during failure of the controller.

The variety of operating elements and safety elements (switches, sensors) results in high cabling expense due to the redundant monitoring of the signal transmitters. The high cable expense also hinders the search for errors during cable defects or malfunctions in the corresponding plug-in connectors.

The large number of operating and protection elements to be monitored (switches, sensors) also causes a high computer load on the monitoring system. This is especially true, since it must be guaranteed by the controller and by the monitoring system that a specific reaction, especially shutdown (stopping) of the printer, occurs within a stipulated interval at specified signal states.

OBJECTS AND SUMMARY OF THE INVENTION

In view of the foregoing, it is an object of the invention to provide an improved monitoring device for a printer, especially a sheet-fed offset printer, that enables easy error identification in the event of a malfunction, while avoiding the aforementioned shortcomings of prior art monitoring devices.

The monitoring device according to the invention has a bus system, via which several computers that enter the signal states of the operating elements, switches and sensors and function as slaves are connected to a master computer. Commands to enter the input (signal state) are repeatedly sent to the individual slaves via the bus system by the master connected to the actual monitoring computer. In response to a command, the individual slaves send an indicator of the inputs present in them (signal states of the operating elements, switches, sensors). The master, connected after the monitoring computer, thus obtains, on each query, an indication of all the input states in the individual units to which the slaves of the monitoring device according to the invention are assigned. The monitoring computer then generates, from its overall input indication, switching commands for the drives and actuators being monitored. If a state results from the input indication entered by the master, based on which a drive or actuator, and especially the main drive of a printer, is to be stopped, this command is sent via the bus system to the corresponding slave in the corresponding unit. The slave receiving this command then causes switching off or stopping of the actuator/drive.

Other objects and advantages of the invention will become apparent upon reading the following detailed description and upon reference to the drawing, in which:

Figure 1:
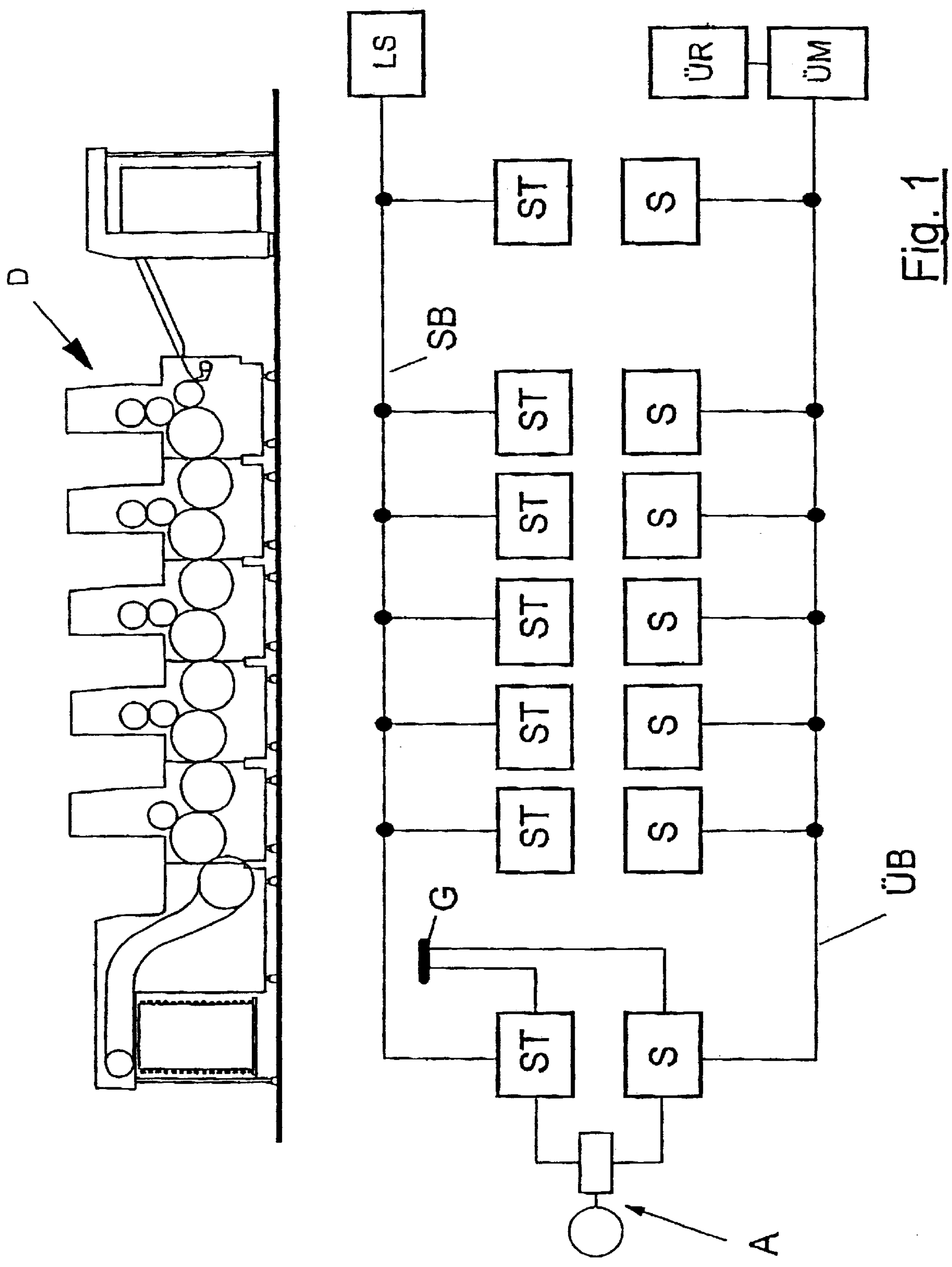
FIG. 1 is a schematic diagram showing a sheet-fed offset printer having a monitoring system in accordance with the invention.

While the invention is susceptible of various modifications and alternative constructions, a certain illustrative embodiment thereof has been shown in the drawing and will be described below in detail. It should be understood, however, that there is no intention to limit the invention to the specific form disclosed. On the contrary, the intention is to cover all modifications, alternative constructions, and equivalents falling within the spirit and scope of the invention.

DETAILED DESCRIPTION OF PREFEFFED EMBODIMENTS

An embodiment of the invention will now be explained with reference to the single drawing. The drawing shows, in a generally schematic form, a sheet-fed offset printer D with a decentralized control, as well as the monitoring system made up of a master UM and slaves S.

The sheet-fed offset printer D as depicted in the figure has a feed device, a delivery device, and printing groups. Stations ST, configured as a computer and forming the overall controller, are connected to the individual units of this printer D. The entering of signals of signal transmitters G arranged in, for example, the delivery device thus occurs via the station (computer) ST connected to the delivery device of the printer D. In the interest of clarity, only one signal transmitter G connected to a station ST is shown in the figure. The signal transmitters G in the individual units of the printer D can be sensors, switches, operating elements, control switches, etc.

Control of actuator/drives A arranged in the corresponding unit also occurs in the individual units in the printer D via the individual computers of the stations ST. Here again, for simplicity, only one actuator/drive A connected to a station ST is shown.

The individual stations ST are connected to each other via a control bus SB, so that switching operations corresponding to the sheet run can be performed in the individual units of the printer D. The stations ST are also connected via the control bus SB to the central control station LS of the printer D.

A slave S is connected as computer to each station ST of the printer D, which is connected via a common serial bus system UB to another computer UM, designed as a master. The master computer UM communicates with a monitoring computer UR. The signal transmitters G in the individual units, as well as the actuators/drives A, in addition to communicating with the stations ST, also communicate with the slave S by means of a corresponding input card. An operating state of the signal transmitter G can therefore be recorded both by the control station ST and by the slave S.

The monitoring master UM connected to the monitoring computer UR periodically sends query commands to the individual slaves S via the monitoring bus UB. In response to the query, each of the slaves S enters the signal states of the connected signal transmitters G via the input cards. An indication of the signal states of transmitters G is sent back by each slave S via the monitoring bus UB to the monitoring master UM, so that the presence of permitted and/or unpermitted states can be determined via the monitoring computer UR from the indication of these state signals of all transmitters G. If the monitoring computer UR finds that a protective grid is opened, for example, during the running of the machine, the monitoring master UM sends, via the monitoring bus UB, a signal to the corresponding slave (main drive), in order to stop the printer. Switching off of the corresponding drive A then occurs via the slave S connected to it. Due to the fact that the monitoring computer UR is connected via a monitoring master UM and the monitoring bus system UB to the slaves S assigned to the respective individual units of the printer, a noticeable simplification in cabling expense is produced, since only one shielded line is necessary for the serial bus system. As an additional advantage, a simultaneous indication of all the switching states of the operating elements, sensors, switches recorded by the slaves is available to the monitoring computer as the result of each query cycle. Therefore, interdependent switching states (signal states) can be determined, and the entire printer and the switching states of signal transmitters mounted on the printer can be monitored.

Since the switching on/off of actuators/drives in the event of a malfunction occurs through a slave of the monitoring system assigned to the corresponding unit, measures adapted to the corresponding hazardous situation being protected against can be introduced. Upon the opening of a protection system between the individual printing groups, the slave assigned to the main drive would shut down the printer drive in response to a master command and therefore stop the operation of the printer itself. If, for example, only a protection system assigned to the ink duct is open during machine operation and print production, to avoid a hazardous situation (feed site), it may be sufficient merely to shut down the corresponding drive (for example, the drive of the duct roller). Interruption of the entire printing process and thus ink flow into the individual printing groups can be avoided in such a situation. Restarting of the machine with a correspondingly large number of wasted sheets is thus unnecessary. After closure of the corresponding protection system and possibly acknowledgment by an operating person, the drive shut down by the monitoring system according to the invention can be switched on again, so that the ink flow malfunction, occurring only briefly in the printing group, if at all, only causes a small number of wasted sheets.

Switching off of the corresponding components occurs via the slave S of the monitoring system assigned to the unit. This slave S receives the command to shut down from the master UM assigned to the monitoring computer as a function of evaluation of the queried switch signal states fed to the master. Individual switching off of actuators and drives during failure of one or more components of the control is thus possible by the monitoring system according to the invention.

In a preferred embodiment of the invention, the slaves S assigned to the monitoring system monitor the cyclical query of the master UM via a software routine. If a query order from the master is absent within a stipulated time interval (which can be caused, for example, by a malfunction in the bus system or a malfunction in the master), switching off of the actuator/drive assigned to the slave or the entire printer (main drive) occurs. Malfunctions in the bus system between the master and the slaves can therefore be monitored, based on errors in signal transmission.

In an alternative preferred embodiment of the invention, each slave assigned to the stations of the unit additionally has a hardware timeout setup (watchdog). In addition to software monitoring of command signals coming from the master, the bus that connects the slaves to the master is also monitored. Here again, in the absence of a master signal within a stipulated time interval, shutdown of the prescribed actuators, drives or the entire printer occurs.

Thus, software and/or hardware timeouts may be provided in the individual slaves S, so that, in the absence of a corresponding query signal from the monitoring master UM, the actuators/drives A can be automatically shut down by the slave S.

What is claimed is:

1. A monitoring device for a printer having individual units and a controller that includes a plurality of control station computers connected by a control bus and records signals of signal transmitters in the individual units and generates command signals for actuators/drivers of the printer based on the signals of the signal transmitters, the monitoring device comprising:

a monitoring computer for recording signals of the signal transmitters and causing the actuators/drivers to switch off based on the signals of the signal transmitters;

a monitoring bus separate from the control bus;

a monitoring master connected to the monitoring bus and connected to the monitoring computer;

a plurality of monitoring slaves connected by the monitoring bus to the monitoring master for communications therewith, each monitoring slave assigned to a corresponding individual unit of the printer and connected to receive signals of signal transmitters of said corresponding individual unit, said each monitoring slave programmed to send an indication of the signals of the signal transmitters to the monitoring master in response to a state query and to switch off actuators/drives connected thereto in response to a command sent via the monitoring bus by the monitoring computer through the monitoring master.

2. A monitoring device as in claim 1, wherein the monitoring bus is a serial bus.

3. A monitoring device as in claim 1, wherein the monitoring master periodically sends the state query to the monitoring slaves via the monitoring bus.

4. A monitoring device as in claim 1, wherein the monitoring master is programmed to monitor indications of signal states sent by the monitoring slaves via the monitoring bus.

5. A monitoring device as in claim 1, wherein said each monitoring slave switches off the actuators/drives connected thereto when no state query from the monitoring master has been received within a timeout period.

6. A monitoring device as in claim 1, wherein said each monitoring slave is programmed to monitor whether the state query from the monitoring master has been received within a timeout period.

7. A monitoring device as in claim 5, wherein said each monitoring slave includes a hardware timeout device for monitoring whether the state query from the monitoring master has been received within a timeout period.

8. A monitoring device as in claim 1, wherein the printer is a sheet-fed offset printer.

* * * * *